United States Patent
Robinson et al.

(10) Patent No.: US 9,312,665 B2
(45) Date of Patent: Apr. 12, 2016

(54) ELECTRICAL DISTRIBUTION SYSTEMS INCUDING PARALLEL ENERGY SOURCE AND METHODS

(71) Applicants: Kristopher Scott Robinson, Atlanta, GA (US); Jeffrey Kenton Hudgins, Jr., Gainesville, GA (US); Arthur Kevin Shumate, Duluth, GA (US); Brian J. Rusch, Suwanee, GA (US); William E. Rose, Flowery Branch, GA (US)

(72) Inventors: Kristopher Scott Robinson, Atlanta, GA (US); Jeffrey Kenton Hudgins, Jr., Gainesville, GA (US); Arthur Kevin Shumate, Duluth, GA (US); Brian J. Rusch, Suwanee, GA (US); William E. Rose, Flowery Branch, GA (US)

(73) Assignee: SIEMENS INDUSTRY, INC., Alpharetta, GA (US)

(*) Notice: Subject to any disclaimer, the term of this patent is extended or adjusted under 35 U.S.C. 154(b) by 302 days.

(21) Appl. No.: 14/029,834

(22) Filed: Sep. 18, 2013

(65) Prior Publication Data
US 2014/0098470 A1    Apr. 10, 2014

Related U.S. Application Data

(63) Continuation-in-part of application No. 13/646,316, filed on Oct. 5, 2012, now Pat. No. 9,124,077.

(51) Int. Cl.
*H02B 1/26* (2006.01)
*H02B 1/03* (2006.01)
*H02B 1/04* (2006.01)

(52) U.S. Cl.
CPC ... *H02B 1/03* (2013.01); *H02B 1/04* (2013.01)

(58) Field of Classification Search
None
See application file for complete search history.

(56) References Cited

U.S. PATENT DOCUMENTS

| | | | |
|---|---|---|---|
| 3,012,218 A | 12/1961 | Cataldo | |
| 3,104,276 A | 9/1963 | Cataldo | |
| 3,183,298 A | 5/1965 | Weimer et al. | |
| 3,786,394 A | 1/1974 | Dempsey, Jr. | |
| 3,909,098 A | 9/1975 | Drilling | |
| 4,327,396 A * | 4/1982 | Schacht | H02B 1/305 361/648 |
| 5,466,889 A | 11/1995 | Faulkner | |
| 5,638,256 A * | 6/1997 | Leach | H02B 1/50 174/58 |
| 5,936,834 A * | 8/1999 | Polston | H02B 1/20 361/660 |
| 6,421,229 B1 * | 7/2002 | Campbell | H02B 1/28 361/622 |
| 7,239,502 B1 * | 7/2007 | Seff | G01R 11/04 361/624 |
| 7,286,339 B2 * | 10/2007 | Baca | H02B 1/52 361/643 |
| 7,559,793 B1 | 7/2009 | Rusch | |
| 8,223,476 B2 * | 7/2012 | Zhang | H02B 1/20 174/54 |
| 9,124,077 B2 * | 9/2015 | Robinson | H02B 1/03 |
| 2009/0150100 A1 * | 6/2009 | Pifer | H02J 9/06 702/62 |
| 2011/0083872 A1 | 4/2011 | Zhang | |

* cited by examiner

*Primary Examiner* — Courtney Smith (57) ABSTRACT

An electrical distribution system having a meter socket, load center combination apparatus is disclosed. The meter socket, load center combination apparatus has an enclosure having a meter socket section with a meter socket configured to receive an owner utility meter, an owner load center with a plurality of locations configured to receive circuit interface devices, and a combination cross bus connection section extending between sides of the enclosure, the cross bus connection section having one or more side openings configured to allow electrical connection to one or more main cross bus bars of a main panel, a parallel energy source disconnect, and a parallel energy source coupled to the parallel energy source disconnect. Methods of configuring electrical distribution systems are disclosed, as are other aspects.

15 Claims, 11 Drawing Sheets

ELECTRICAL DISTRIBUTION SYSTEMS INCUDING PARALLEL ENERGY SOURCE AND METHODS

RELATED APPLICATIONS

This application is a continuation-in-part of, and claims priority from, U.S. patent application Ser. No. 13/646,316 filed on Oct. 5, 2012, entitled "Meter Socket And Load Center Combination Apparatus, Electrical Distribution Systems, And Methods Of Assembly," the disclosure of which is hereby incorporated by reference in its entirety herein.

FIELD

The present invention relates generally to systems and methods for electrical power distribution using one or more parallel energy sources.

BACKGROUND

Meter socket and distribution panel combinations for multi-unit complexes (e.g., residences and/or business centers) include a meter stack having meter sockets configured to receive multiple utility meters (e.g., one per tenant unit). The utility meters of the meter stack may be electrically coupled to one or more tenant distribution panels adapted to contain one or more circuit interconnect devices, such as circuit breakers that may be used to protect tenant electrical branch circuits. In some configurations, one meter of the meter stack may be coupled to an owner distribution panel, which may have owner circuits, community lighting circuits, entryway heating circuits, and other community electrical equipment connected as electrical loads. In some embodiments, one or more parallel energy sources may be coupled to a subpanel also connected to the owner utility meter. The one or more parallel energy sources may be photo-voltaic cells (e.g., solar panels, or the like).

In such conventional systems where parallel energy sources (e.g., solar panels) are provided, the parallel energy sources are typically connected to the sub-panel on the load side of the meter stack. Thus, although the owner may get electricity credits for any parallel power not consumed by the community circuits and/or owner circuits, performance of existing systems may be limited.

Therefore, there is a need for improvements to electrical distribution systems including meter stack and distribution panels for multi-unit settings which include parallel energy sources.

SUMMARY

According to a first aspect, an electrical distribution system is provided. The electrical distribution system includes a main load center panel including a main disconnect adapted to electrically connect to a utility power source, a meter stack having one or more tenant utility meters, each tenant utility meter being electrically coupled to the main disconnect, a meter socket, load center combination apparatus electrically coupled to the main disconnect, the meter socket, load center combination apparatus including an owner utility meter, an owner load center electrically coupled to the owner utility meter and having a plurality of locations configured to receive circuit interface devices, and a parallel energy source disconnect having an amperage rating up to a rating of the owner load center, and a parallel energy source electrically coupled to the parallel energy source disconnect.

According to another aspect, an electrical distribution system is provided. The electrical distribution system includes a main panel including a main disconnect adapted to electrically connect to a utility power source, a meter stack having a plurality of tenant utility meters, each tenant utility meter being electrically coupled to the main disconnect, a meter socket, load center combination apparatus electrically coupled to the main disconnect and modularly coupled to the main panel, the meter socket, load center combination apparatus including a cross bus connection section including combination cross bus bars, an owner utility meter coupled to the combination cross bus bars, an owner load center electrically coupled to the owner utility meter and having a plurality of locations configured to receive circuit interface devices, a load center combination main breaker configured to protect the owner load center, and a parallel energy source disconnect having an amperage rating equal to an amperage rating of the owner load center; and a parallel energy source electrically coupled to the parallel energy source disconnect.

According to yet another aspect, a method of configuring a power distribution system is provided. The method includes providing a meter socket, load center combination apparatus having a first enclosure having a first side and a second side, and one or more first side opening, the first enclosure having a meter socket configured to receive an owner utility meter, an owner load center, a cross bus connection section extending between the first side and the second side, the cross bus connection section containing one or more combination cross bus bars, and parallel energy source disconnect coupled to the meter socket, modularly coupling a main panel having one or more second side openings to the first enclosure, the main panel containing one or more main cross bus bars, connecting the one or more combination cross bus bars to the one or more main cross bus bars through the one of the one or more first side openings of the first enclosure and the one or more second side openings of the main panel, and connecting a parallel energy source to the parallel energy source disconnect.

According to another aspect, an electrical distribution system is provided. The electrical distribution system includes a main panel including a main disconnect adapted to electrically connect to a utility power source, a meter socket, load center combination apparatus electrically coupled to the main disconnect, the meter socket, load center combination apparatus modularly coupled to the main panel, the meter socket, load center combination apparatus including a utility meter, a load center electrically coupled to the utility meter and having a plurality of locations configured to receive circuit interface devices, a parallel energy source disconnect having an amperage rating up to an amperage rating of the load center, and a parallel energy source electrically coupled to the parallel energy source disconnect.

Still other aspects, features, and advantages of the present invention may be readily apparent from the following description by illustrating a number of example embodiments and implementations, including the best mode contemplated for carrying out the present invention. The present invention may also be capable of other and different embodiments, and its several details may be modified in various respects, all without departing from the substance and scope of the present invention. Accordingly, the drawings and descriptions are to be regarded as illustrative in nature, and not as restrictive. The drawings are not necessarily drawn to scale. The invention covers all modifications, equivalents, and alternatives falling within the substance and scope of the invention.

DESCRIPTION

Reference will now be made in detail to various embodiments, examples of which are illustrated in the accompanying drawings. Wherever possible, the same reference numbers will be used throughout the drawings to refer to the same or like parts.

Figure 1:
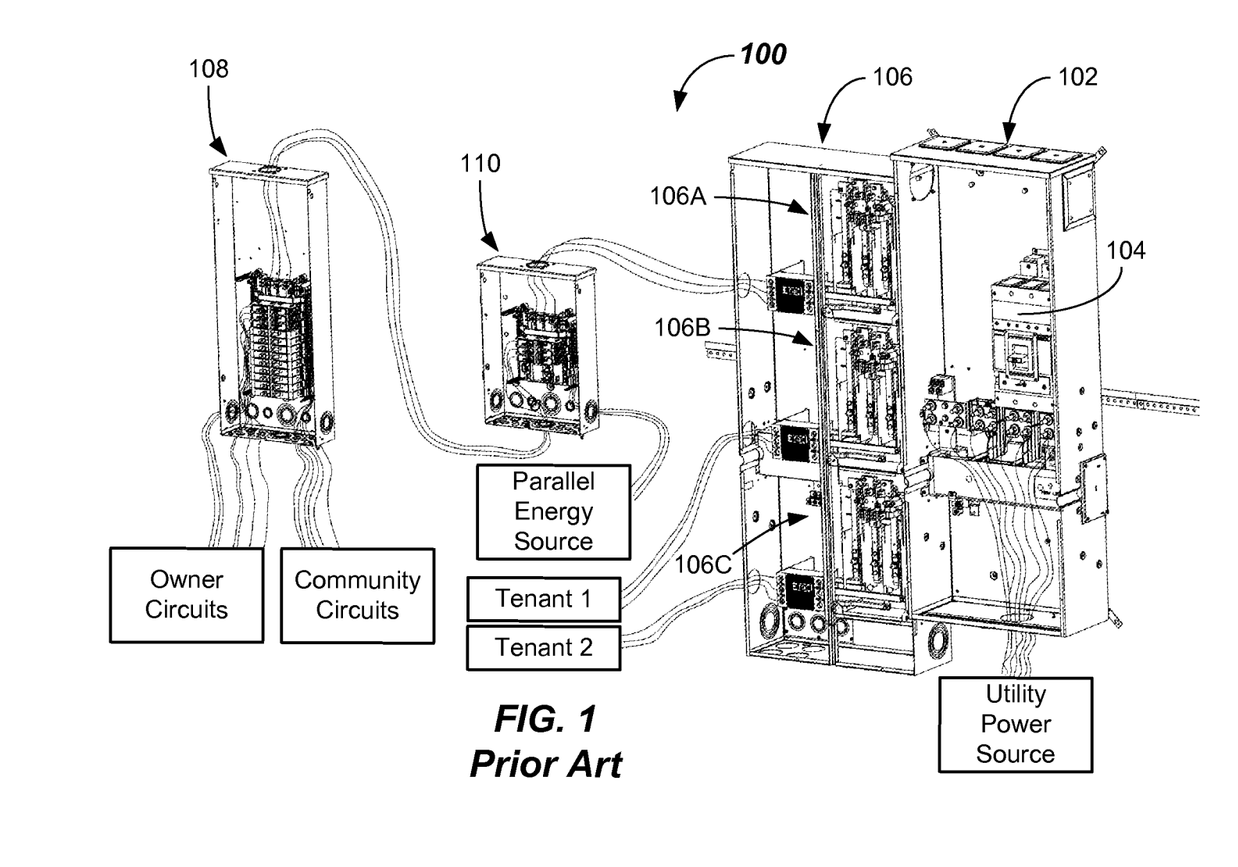
FIG. 1 illustrates a front isometric view of an electrical distribution system according to the prior art (with covers removed).

Existing conventional electrical distribution systems 100, as shown in FIG. 1, for providing electrical power distribution to multiple tenant units, such as apartments or business parks involve use of a main panel 102 for housing a main breaker 104, and a meter stack panel 106 including individual meter sockets 106A, 106B, 106C adapted to receive an owner utility meter and tenant utility meters (meters not shown). The meter sockets 106B, 106C are adapted for connecting tenant utility meters that couple to tenant panels (e.g., tenant distribution panels designated as Tenant 1 and Tenant 2). Owner meter socket 106A is adapted to receive an owner utility meter. A separate panel load center 108 including circuit breakers for protected branch electrical circuits, i.e., owner circuits and/or community circuits, is coupled to the owner utility meter. In some systems, a subpanel 110 may be provided. A parallel energy source, such as a solar panel, may be connected to the subpanel 110.

However, a size of the parallel energy source in such prior systems is amperage limited due to code restrictions, such as by restrictions imposed by NEC 705.12, for example. Thus, although the owner may get appropriate electricity credits for any energy generated by the parallel energy source that is not consumed by the community circuits and/or owner circuits, only relatively small parallel energy sources may be used. In short, the sum of the amperage ratings of overcurrent devices supplying power to the bus bars in subpanel 110 shall not exceed 120% of the bus bar rating of this subpanel 110. This puts a limit on the size of the parallel energy source feeding subpanel 110. For example, if the rating of the main bus bars of sub-panel 110 is 225 amps, then the sum of the amperage ratings of the main breaker feeding the sub-panel 110 plus the amperage rating of the circuit breaker being fed by the parallel energy source shall not exceed 270 amps. Thus, if the circuit breaker feeding sub-panel 110 is 200 amps, then the circuit breaker being fed by the parallel energy source cannot exceed 70 A, under the restrictions provided by NEC 705.12. Accordingly, the amperage output of the parallel energy source is limited.

The aforementioned problems of previous electrical power distribution systems are overcome by one or more embodiments of the present invention. In particular, the inventive electrical distribution system includes a main panel having a main disconnect adapted to electrically connect to a utility power source, a meter stack having one or more tenant utility meters, a meter socket, load center combination apparatus having an owner utility meter, a load center section (owner load center) electrically coupled to the owner utility meter which may be optionally protected by a load center combination main breaker (e.g., owner main breaker), a parallel energy source disconnect, and a parallel energy source electrically coupled to the parallel energy source disconnect. Accordingly, the parallel energy source disconnect may have an amperage rating up to a rating of the owner load center. Thus, relatively much larger parallel energy sources may be used, and the owner may still get full electrical credits therefor. Additionally, modular connection minimizes electrical wiring and allows for compact and efficient installations of owner load centers and parallel energy sources.

Accordingly, embodiments of the invention provide a compact and efficient electric power distribution system enabling electrical connections for tenants and owners and use of relatively large parallel energy sources, while providing full electrical credits to the owner. The invention will be explained in greater detail with reference to FIGS. 2-5 below.

Figure 2:
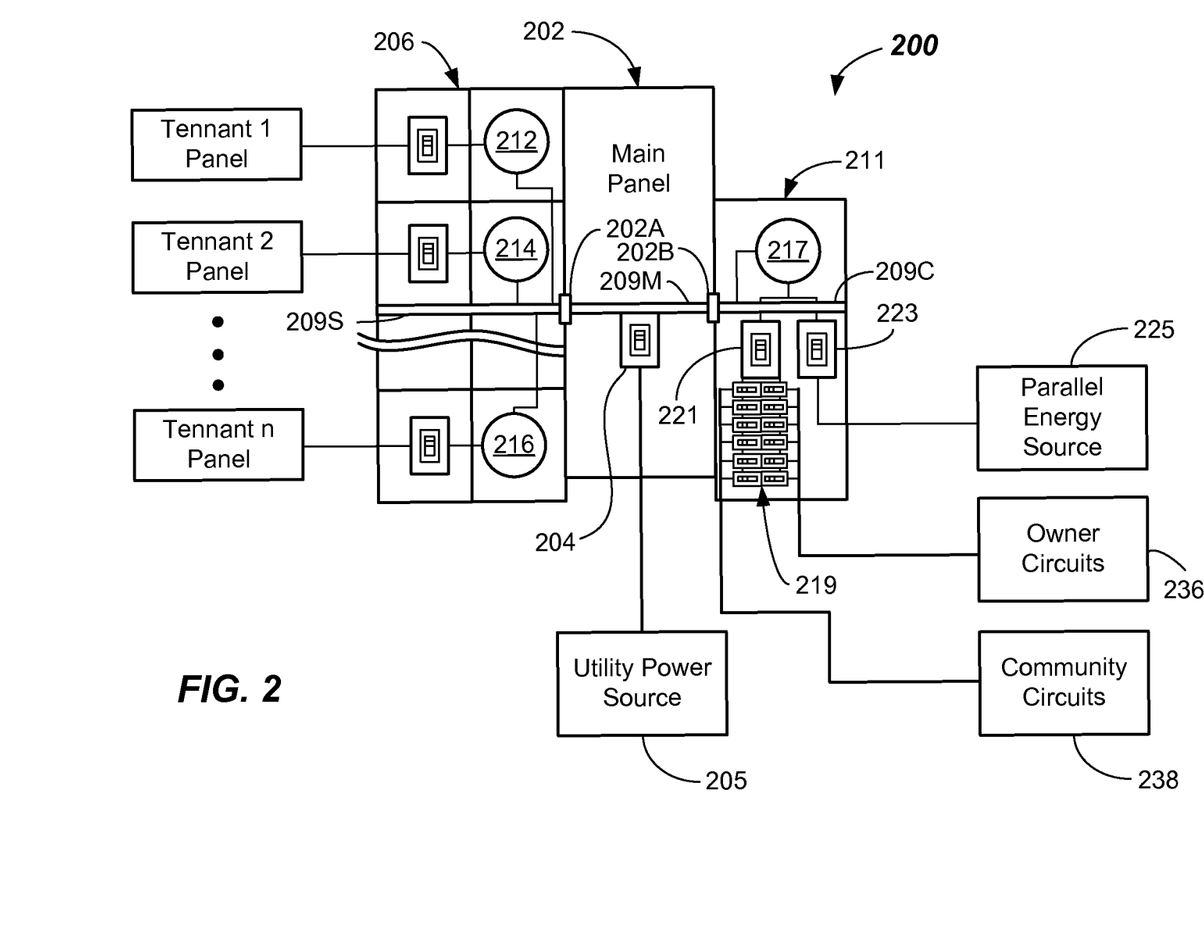
FIG. 2 illustrates a front schematic view of an electrical distribution system including modular connection and one or more parallel energy sources coupled to a meter socket, load center combination apparatus according to embodiments.

FIG. 2 illustrates an embodiment of an electrical distribution system 200 that may be used within a tenant/owner setting, for example. Tenant/owner setting refers to any setting where some distribution tenant panels are to be separated, for financial reasons, from an owner distribution panel. For example, tenant/owner settings may include several tenant panels that provide electricity to rental (e.g., leased units), and an owner panel that includes owner circuits and/or community circuits. However, the present invention may find utility beyond owner/tenant settings.

One or more embodiments of the electrical distribution system 200 includes a main panel 202 including a main disconnect 204, which is adapted to electrically connect to and disconnect from a utility power source 205, a meter stack 206, and a meter socket, load center combination apparatus 211. The main disconnect 204 may be a main circuit breaker, main switch, main tap box, or the like. The meter stack 206 may have one or more tenant utility meters, such as tenant utility meters 212, 214, 216, wherein each tenant utility meter 212, 214, 216 is electrically coupled to the main disconnect 204. Electrical coupling may be by suitable electrical conduits, and may be made by stack cross bus bars 209S coupled to main cross bus bars 209M in some embodiments (as shown). Each tenant panel may be protected by a suitable circuit disconnect device (e.g., main tenant circuit breaker).

A meter socket, load center combination apparatus 211 may also be electrically coupled to the main disconnect 204, such as by coupling the main cross bus bars 209M to combination cross bus bars 209C. Connections may be by any suitable mechanical connection, such as mechanical quick connects 202A, 202B at the interfaces of the enclosures. Meter socket, load center combination apparatus 211 includes an owner utility meter 217 and an owner load center 219 electrically coupled to the owner utility meter 217 such as by a vertical bus bar.

The owner load center 219 may be protected by a load center combination main breaker 221 in some embodiments. Meter socket, load center combination apparatus 211 includes, in the owner load center 219, a plurality of locations (e.g., 6, 8, 12, or 24 positions) configured to receive circuit interface devices. The circuit interface devices may be a circuit breaker, an electrical switch, a branch monitoring device, a surge protection device, a lug kit, or the like. Other numbers of locations may be provided.

Meter socket, load center combination apparatus 211 includes a parallel energy source disconnect 223 coupled to the owner utility meter 217. Parallel energy source disconnect 223 has an amperage rating up to a rating of the owner load center 219, that is, up to the amperage rating of the bus bars on the owner load center 219. For example, if the owner load center 219 has a 400 A rating, then the parallel energy source disconnect 223 may have an amperage rating up to 400 A. As such, one or more parallel energy source 225 may be electrically coupled to the parallel energy source disconnect 223 and may generate current up to 400 A in this example. According a relatively larger number of parallel energy sources may be connected in parallel and power generation capability may be enhanced beyond that achievable by existing systems. Owner circuits 236 and community circuits may be connected to owner load center 219. In some embodiments, the parallel energy source disconnect 223 may have an amperage rating up to 600 A, such as when a K-Power Mod™ Meter socket (type WMK) is used. In this instance, the owner load center 219 may have an amperage rating up to 600 A, and the load center combination main breaker 221, if provided, may have an amperage rating up to 600 A.

In more detail, as shown in FIGS. 3A-3H, the meter socket, load center combination apparatus 211 includes an enclosure 313 (e.g., a metal box) that may include a first side 313A, a second side 313B, a top side 313C, bottom side 313D, and back side 313E. Covers 315A, 315B, and 315C and door 315D may be included on the front as part of the enclosure 313. One of the covers (e.g., 315A) may include a meter window 315M (FIG. 3A) adapted to allow a utility meter (not shown) to be viewed with the cover 315A in a closed orientation. The enclosure components may be manufactured from bent rigid sheet material, such as sheet steel. Other suitable materials may be used.

Figure 3A:
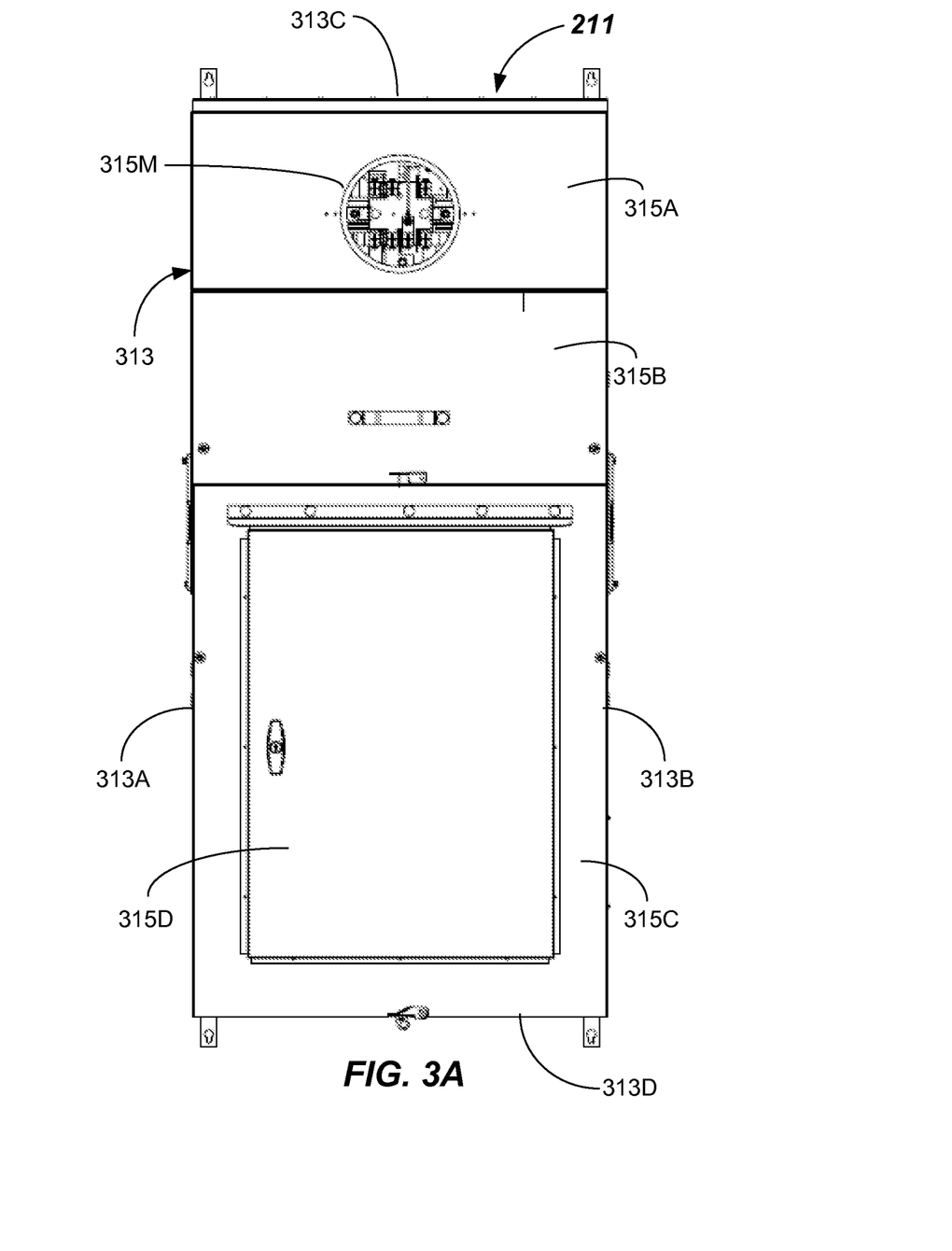
FIG. 3A illustrates a front plan view of a meter socket, load center combination apparatus according to embodiments.
Figure 3B:
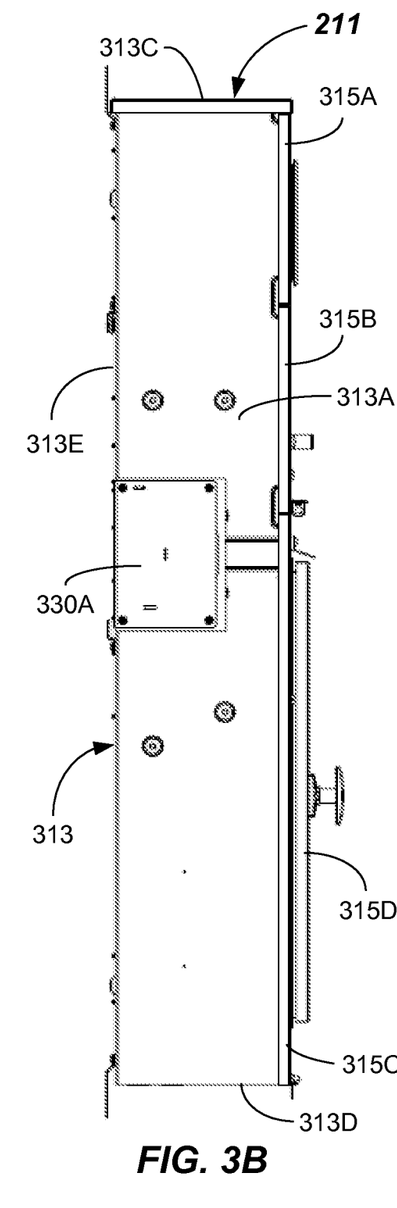
FIG. 3B illustrates a left side plan view of a meter socket, load center combination apparatus according to embodiments.
Figure 3C:
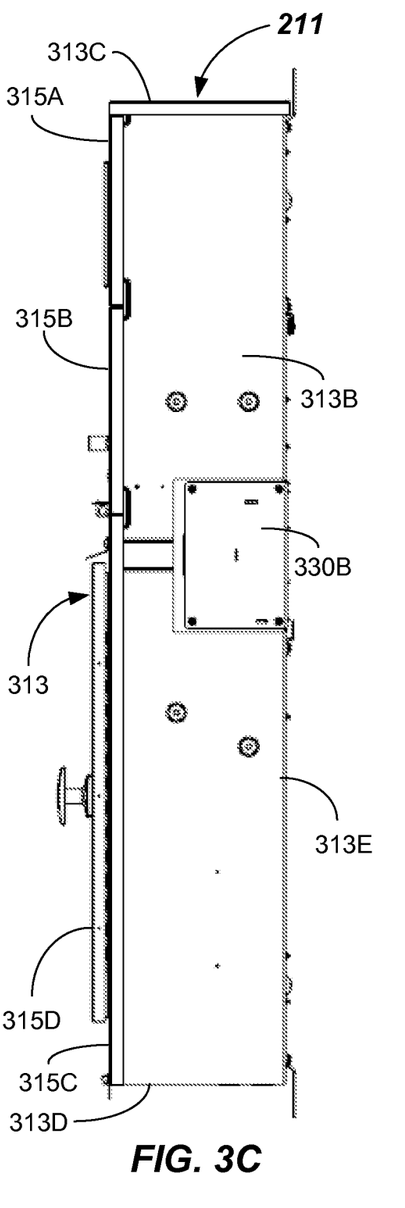
FIG. 3C illustrates a right side plan view of a meter socket, load center combination apparatus according to embodiments.
Figure 3D:
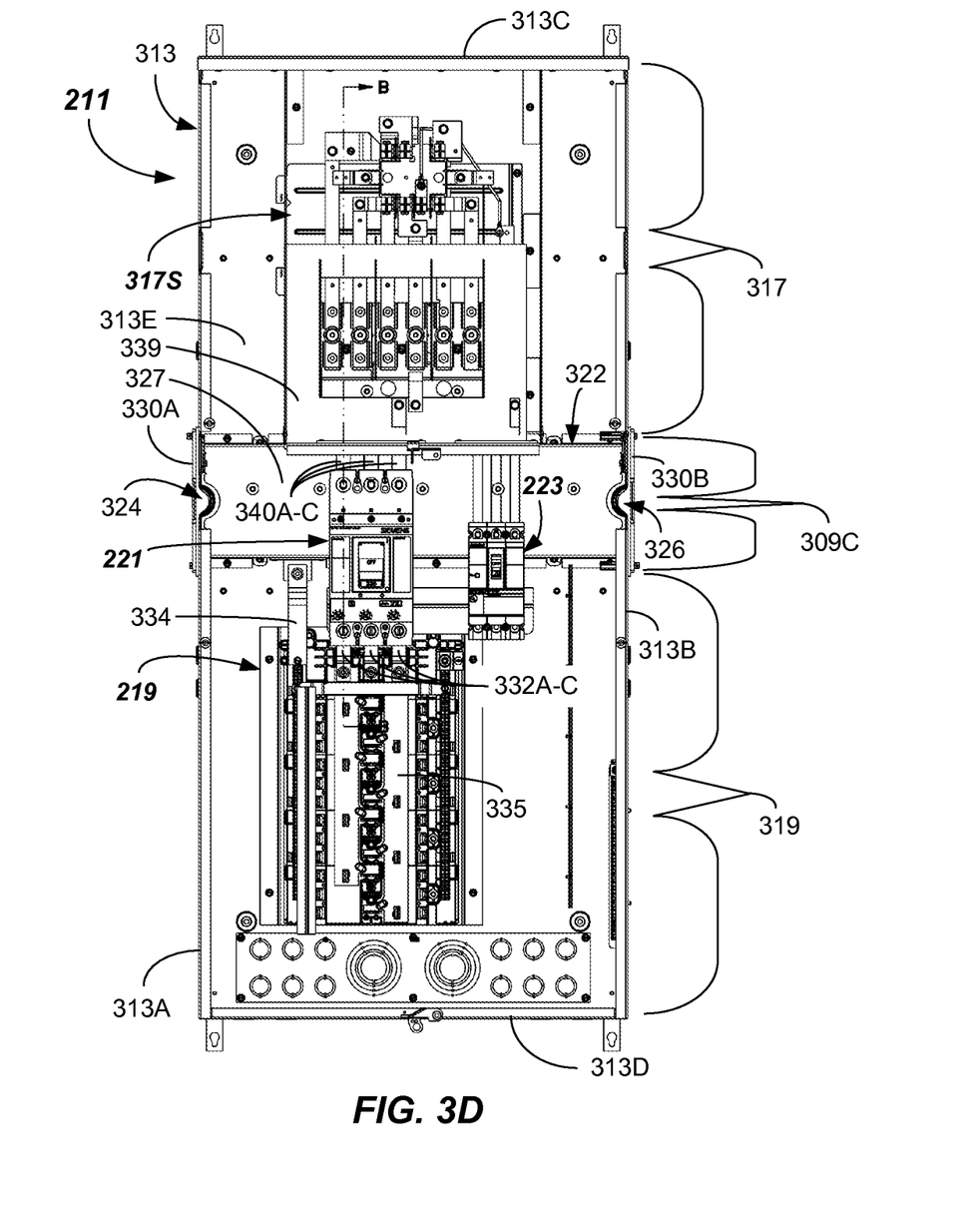
FIG. 3D illustrates a front plan view, with covers removed, of a meter socket, load center combination apparatus according to embodiments.
Figure 3E:
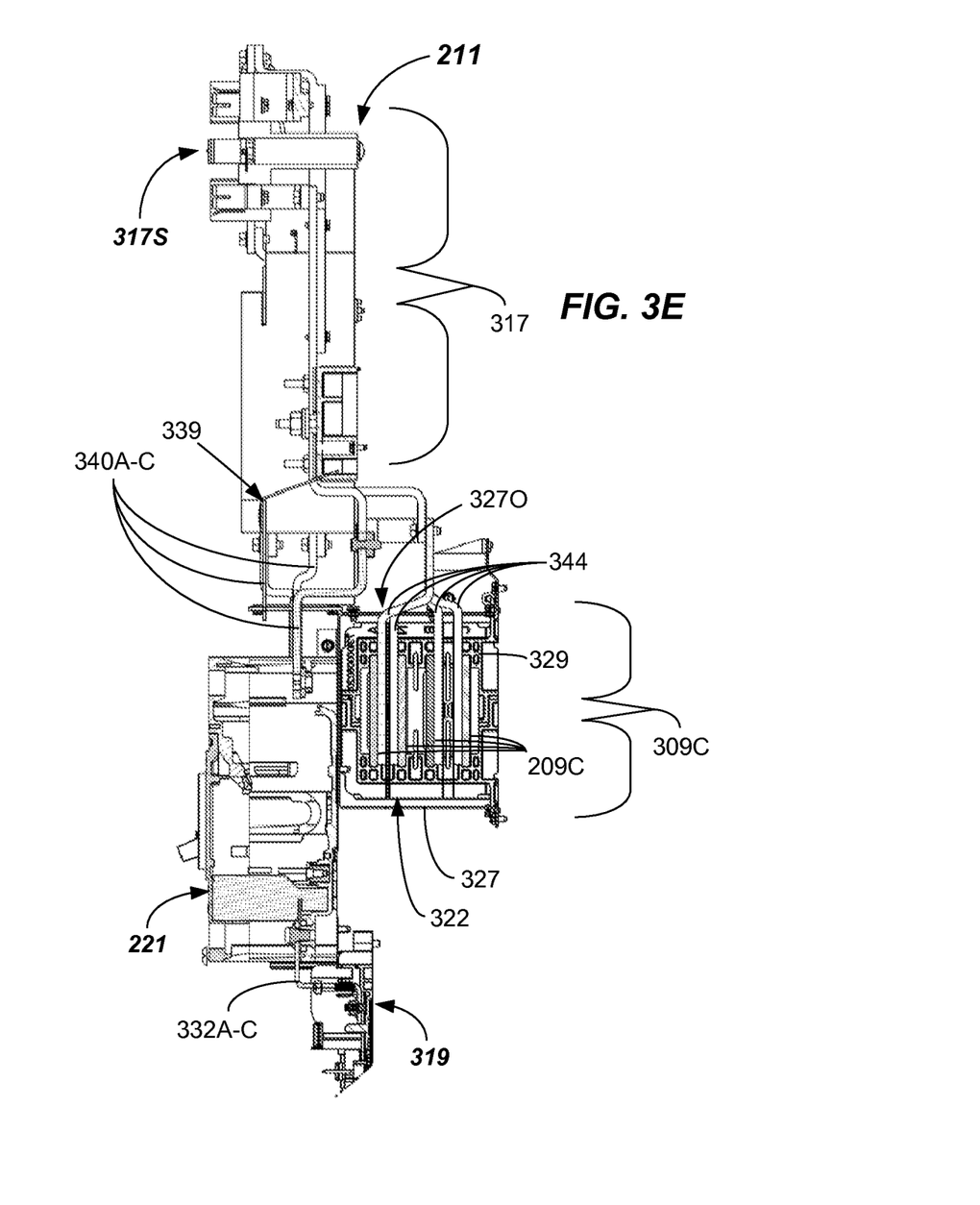
FIG. 3E illustrates a partial cross-sectioned side view of a meter socket, load center combination apparatus according to embodiments.

The enclosure sides, covers, and doors may form a meter socket section 317 and a load center section 319, located at a top and bottom, respectively, as shown in FIGS. 3D and 3E. This orientation may be reversed in some embodiments. The meter socket section 317 has a meter socket 317S configured to receive a utility meter (not shown). The meter socket 317S may be a plug-on type, as is conventional. Meter socket 317S may have an amperage rating of up to 600 A or more.

The load center section 319 has an owner load center 219 having a plurality of locations configured to receive one or more circuit interface devices. A circuit interface device may be any electrical device that connects, protects or monitors an electrically coupled branch circuit such as a conventional circuit breaker, a device adapted to monitor an electrical circuit branch, such as a branch monitoring device (BMD), a surge protection device, an electrical switch, a lug kit, or the like.

Within the enclosure 313, a cross bus connection section 309C is provided. The cross bus connection section 309C extends laterally from the first side 313A to the second side 313B and provides an internal channel 322 into which one or more cross bus bars 209C may extend (See FIGS. 3E-3G). The cross bus connection section 309C may be located between the meter socket section 317 and the load center section 319, as shown in FIG. 3D. However, the cross bus connection section 309C may optionally be provided at the top or bottom of the enclosure 313. The cross bus connection section 309C may have one or more first side openings 324, 326 configured and adapted to facilitate connection to the one or more cross bus bars in other adjacent structures (e.g., cross bus bars 209C). A cross bus housing 327 of the cross bus connection section 309C is configured to at least partially surround the one or more cross bus bars 209C received in the internal channel 322.

Figure 3F:
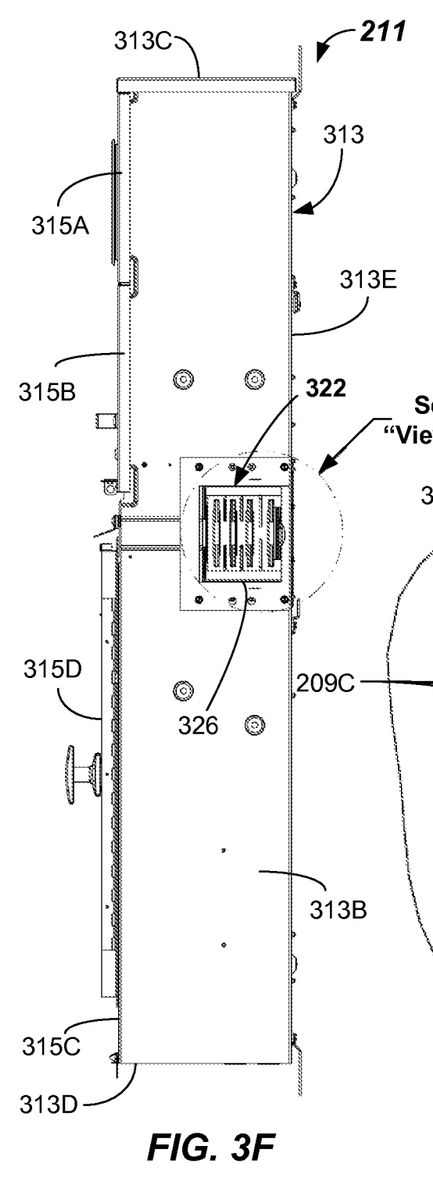
FIG. 3F illustrates a right side plan view of a meter socket, load center combination apparatus with the opening cover removed illustrating a cross bus connection section according to embodiments.
Figure 3G:
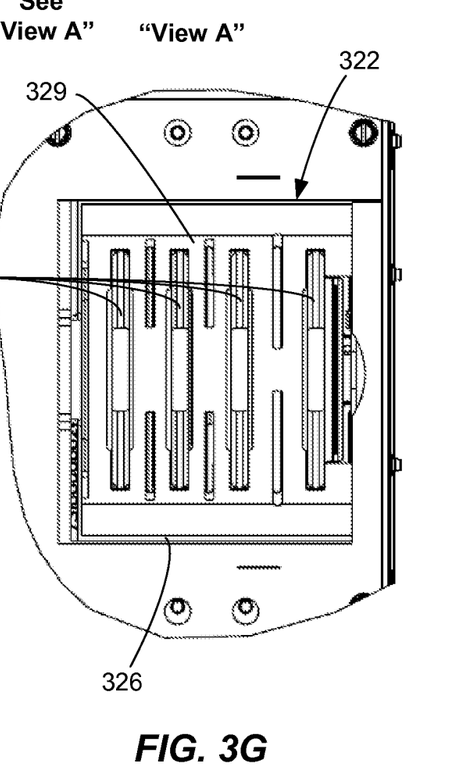
FIG. 3G illustrates an enlarged plan view of a cross bus connection section of a meter socket, load center combination apparatus according to embodiments.

Cross bus housing 327 may be secured to the back side 313E of the enclosure 313 by suitable fasteners (e.g., screws) such that the cross bus bars 209C are entirely radially surrounded by a housing structure. Cross bus bars 209C are conductive bars adapted to carry electricity (e.g., A, B, and/or C phases of electricity). One of the cross bus bars 209C may function as an electrical neutral. The cross bus bars 209C may have bar shape having a thickness greater than a width, and a length longer than both the width and thickness, wherein the length extends laterally across the enclosure 313. The cross bus bars 209C may be constructed from a conductive material (e.g., copper, aluminum, or the like) and received in one or more insulator supports 329 that are retained in the channel 322. In some embodiments, at least two spaced insulator supports 329 are used. The insulator supports 329 support the cross bus bars 209C within the channel 322. Insulator supports 329 are described in US Patent Application Publication US2011/0083872 entitled "CROSSING BUS SUPPORT APPARATUS, CONNECTORS, SYSTEMS AND ASSEMBLES METHODS OF INSTALLING SAME," filed on Oct. 6, 2010.

In one or more embodiments, the two side openings 324, 326 are provided in the enclosure 313; a first opening 324 through the first side 313A and a second opening 326 through the second side 313B. Removable side covers 330A and 330B may be secured over the openings 324, 326. The removable side covers 330A, 330B on one or more of the first side 313A and the second side 313B may be removable and configured to provide access into the internal channel 322 of the cross-bus connection section 309C. In the depicted embodiment, the cross bus bars 209C act as one or more first cross bus bars that are configured and adapted connect to one or more second cross bus bars (e.g., main cross bus bars 209M) in another directly abutting enclosure (e.g., in a main panel 202—See FIG. 2, and FIGS. 4A-4B).

In the meter socket section 317, the meter socket 317S may be mounted to the back side 313E, such as by fasteners (e.g., screws). Power to the line side terminals of the meter socket 317S may be carried by the cross bus bars 209C. The meter socket 317S includes electrical contacts (e.g., clips) adapted to contact meter inputs and meter outputs and is adapted to receive and mount the utility meter, which may be a conventional-type of utility meter. Any suitable meter may be used. In the depicted embodiment, the utility meter connected to socket 317S is an owner utility meter 217.

In the load center section 319, the owner load center 219 may be mounted to the back side 313E, such as by fasteners (e.g., screws). The meter socket, load center combination apparatus 211 may include conductor straps 332 A-C and 340 A-C that electrically couple between the owner load center 219 and the meter socket 317S. For example, if used, the current path may be through the load center combination main breaker 221. The meter socket, load center combination apparatus 211 may also include a neutral strap 334 that couples between the owner load center 219 and the neutral cross bus of the cross bus bars 209C. The owner load center 219 may also include a base 335 and a plurality of phase stabs (e.g., A, B and or C phase stabs) at staggered vertical locations. Each location is adapted to receive a conventional circuit interconnect device (e.g., circuit breaker, switch, BCM, surge protection device, or the like). The circuit interconnect devices (not shown) couple to the owner load center 219, at the various vertical locations and allow service, protection, monitoring, or switching of a plurality of owner circuit 236 and/or community circuits 238 electrical branches including electrical loads connected to the circuit interconnect devices as shown in FIG. 2. The base 335 may be manufactured from an insulator material (e.g., plastic) and be mounted to the back side 313E of the enclosure 313 by fasteners (e.g., screws). Any suitable construction of the owner load center 219 may be used. Load centers may sometimes be referred to as panelboards or panel boxes.

The owner load center 219 may include, for example, a plurality of spaces/locations at which a plurality of circuit interconnect devices may be coupled. For example, in the depicted embodiment of FIG. 3D, the number of locations shown is about 8. Other sizes and numbers of locations may be used, such as 6 space, 10 space, 12 space, 16 space, 20 space, 24 space, 30 space, or more, etc. Not all locations need to include a circuit interconnect device.

The meter socket, load center combination apparatus 211 may include a load center combination main breaker 221 electrically coupled between the meter socket 317S and the owner load center 219. In particular, the load center combination main breaker 221 may be electrically coupled between the load terminals of the meter socket 317S and the line terminals of the owner load center 219. The electrical connection may be factory installed using conductive straps (e.g., vertically-extending metal straps). The load center combination main breaker 221 may be operational to provide and shut off electrical power to the owner load center 219, and in particular to the bus bars (e.g., A and B or A, B, and C phase) within or mounted to the base 335 that are connectable to the circuit interface devices (not shown). The load center combination main breaker 221 and parallel energy source disconnect 223 may be a single phase or three phase circuit breaker (as shown).

The parallel energy source 225 (FIG. 2) is coupled to the parallel energy source disconnect 223. Because the parallel energy source 225 is an energy producing device (photovoltaic panel, windmill, or other electrical energy generator device, or the like), an amperage rating of the parallel energy source disconnect 223 may have a rating up to the maximum amperage rating of the owner load center 219.

In the depicted embodiment, the owner load center 219 may have an amperage rating of up to a 600 A, the load center combination main breaker 221 may have an amperage rating up to a 600 A, and may be a 3-phase circuit breaker, and the parallel energy source disconnect 223 may have an amperage rating up to a 600 A, and be a 3-phase circuit breaker. The parallel energy source 225 may be a collection of alternative energy sources (e., wind mills or solar panels) whose output is up to 600 A. Other types and ratings of the owner load center 219, load center combination main breaker 221, and parallel energy source disconnect 223 may be used.

For example, the owner load center 219 may have an amperage rating of between 225 A to a 600 A, and the parallel energy source disconnect 223 may have an amperage rating of between 225 A and 600 A. If used, the load center combination main breaker 221 may have an amperage rating between 225 A and 600 A.

As shown, the load center combination main breaker 221 may be mounted in front of the cross bus housing 327, and between the cross bus housing 327 and the door 3158. The handle of the load center combination main breaker 221 may be accessible through the door 3158, when the door 3158 is opened.

Figure 3H:
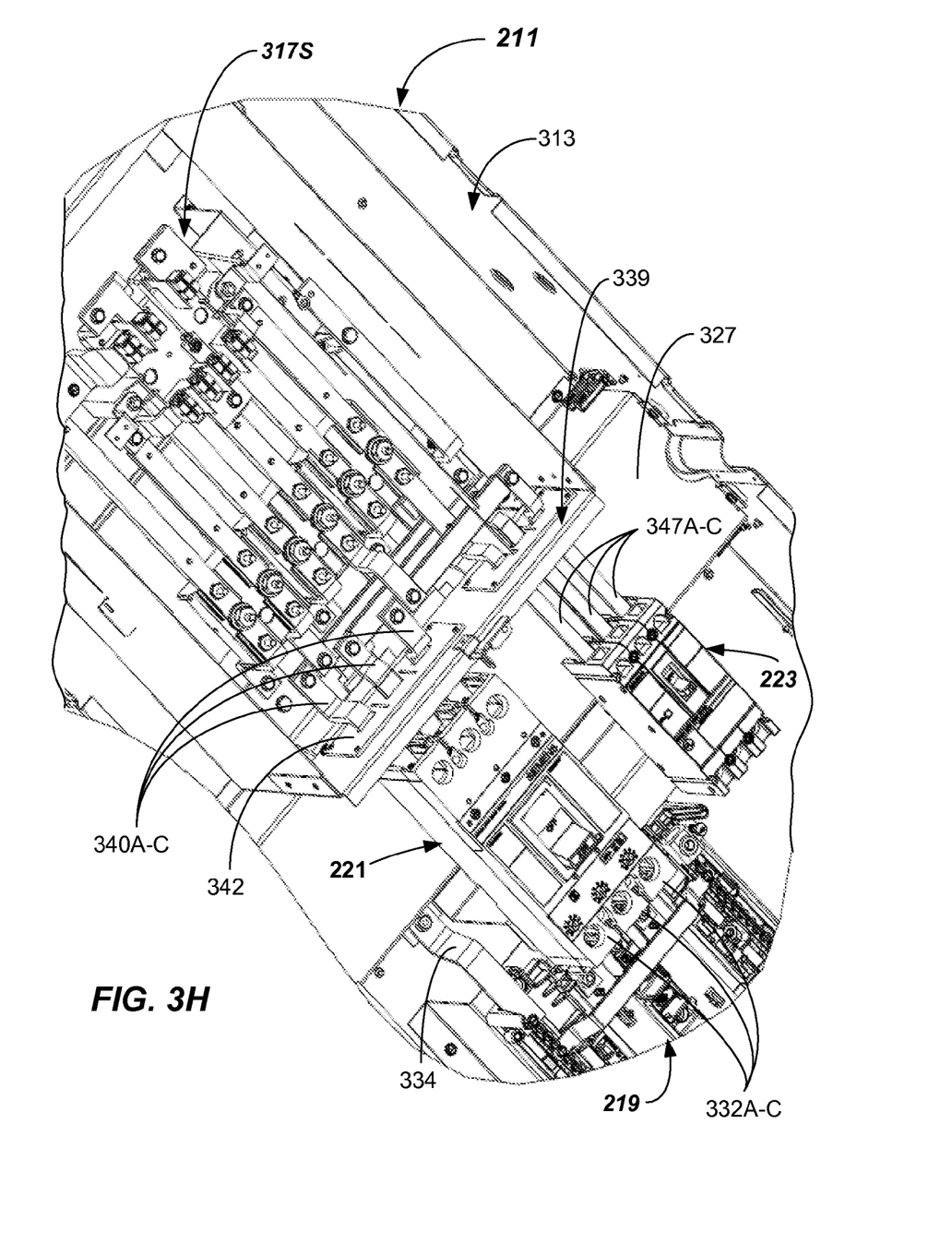
FIG. 3H illustrates a partial isometric view of shields and cross bus housing of a meter socket, load center combination apparatus according to embodiments.

Now referring to FIGS. 3E and 3H, the configuration and interconnection of various example components are shown. The meter socket, load center combination apparatus 211 may include a shield 339 that at least partially covers some portion of the one or more main breaker line conductor straps 340A-C. The main breaker line conductor straps 340A-C electrically couple to the terminals of the load center combination main breaker 221 to the load side of the meter socket 317S. One or more conductor straps 332A-C may electrically couple the load center combination main breaker 221 to the owner load center 219. Each of the one or more conductor straps 332A-C (e.g., one for each phase of electricity) may be electrically coupled to a respective phase bus bars of the owner load center 219.

In one or more embodiments, the line conductor straps 340A-C may be received through openings in the shield 339 and may be coupled to the meter socket 317S. The openings may be included in an insulator member 342 having individual openings for receiving each line conductor straps 340A-C there through. The shield 339 may be physically coupled to the cross bus housing 327, such as on an upper side or front side thereof, or positioned adjacent thereto. The meter socket, load center combination 211 includes one or more cross bus conductor straps 344 electrically coupling the one or more cross bus bars 209C to the meter socket 317C. The cross bus conductor straps 344, which may be an A, B, C phase and neutral, may pass through openings 3270 formed in defined regions of a top wall of the cross bus housing 327.

As shown in FIG. 3D, the meter socket, load center combination apparatus 211 may include the parallel energy source disconnect 223 coupled directly to the meter socket 317S. The parallel energy source disconnect 223 may be physically coupled and mounted in front of the cross bus housing 327 and located adjacent (e.g., side-by-side) to the load center combination main breaker 221, if used. The parallel energy source disconnect 223 may be connected directly to the load side terminals of the meter socket 317S by parallel source conductor straps 347A-C and may have the same amperage rating as the owner load center 219 in some embodiments.

Figure 4A:
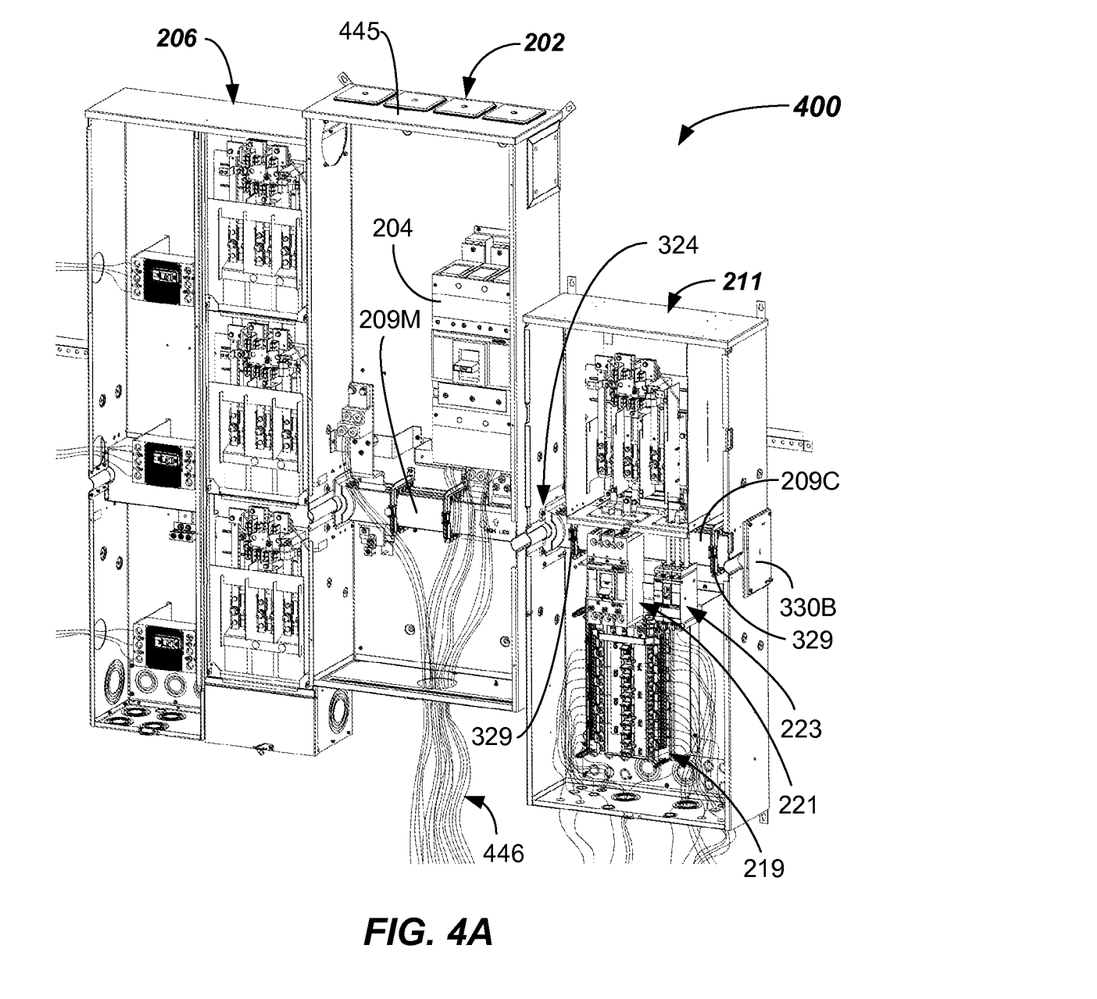
FIG. 4A illustrates a front isometric view of an electrical distribution system, with covers removed, having a meter socket, load center combination apparatus modularly coupled to a main panel according to embodiments.
Figure 4B:
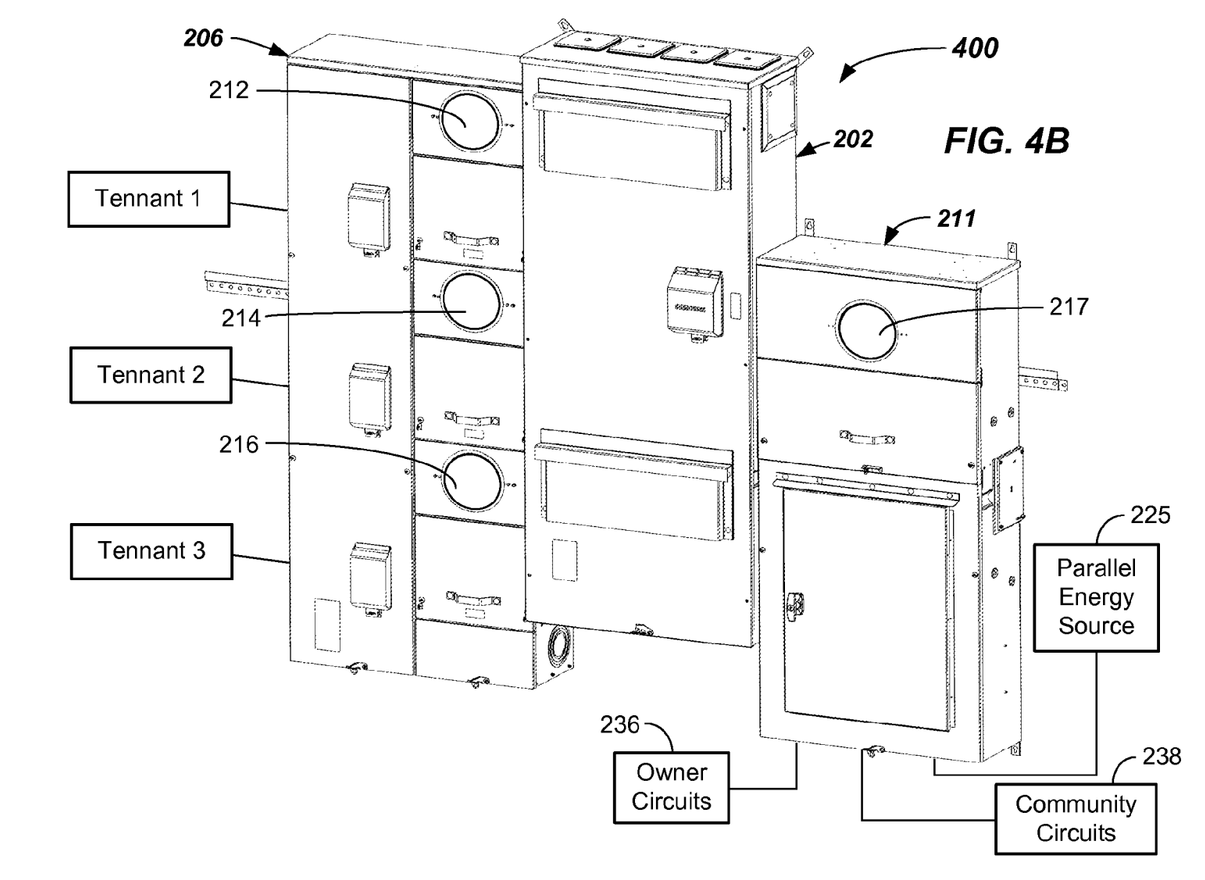
FIG. 4B illustrates a front isometric view of an electrical distribution system, with covers installed, having a meter socket, load center combination apparatus modularly coupled to a main panel according to embodiments.

An embodiment of modular electrical distribution system 400 including the meter socket, load center combination apparatus 211 is shown in FIGS. 4A-4B. The meter socket, load center combination apparatus 211, as shown, is mounted and modularly coupled to an adjacent to a second enclosure 445 of a second panel apparatus such as the main panel 202.

"Modularly coupled," as used herein means that the two enclosures are coupled in directly abutting relationship. The second panel apparatus (e.g., main panel 202) may include the main enclosure 445 housing the main disconnect 204 that receives electrical power from the utility power source 205, such as through wired electrical conduit connections 446 shown (e.g., main utility lines).

As can be seen in FIG. 4A, the combination cross bus bars 209C of the meter socket, load center combination apparatus 211 are directly electrically connected to main cross bus bars 209M of the main panel 202 at the first side opening 324 by a quick connect. In this embodiment, second side opening 326 (FIG. 3F-3G) is closed with cover 330B. The cross bus housing (e.g., cross bus housing 327) is not shown in FIG. 3A so that the connection through the first side opening 324 and the spacing of the insulator supports 329 may be illustrated. A plurality of insulator supports 329 are shown.

The parallel power source disconnect 223 may be a circuit breaker rated up to the amperage rating of the owner load center 219, and up to the amperage rating of the load center combination main breaker 221 if used, for example. The parallel power source disconnect 223 may be rated at 125 A, 225 A, 400 A, or even 600 A, for example. Other amperage ratings values may be used. Likewise, the load center combination main breaker 221 connected to the owner load panel 219 may be rated at 125 A, 225 A, 400 A, or 600 A, for example. Other amperage ratings values may be used.

The utility power source 205 may be a conventional public utility service provided at about 240 V, for example. Any suitable phases of service may be provided. In some embodiments, the electrical power service may be between about 250 A to 2000 A, for example. Other amperage values may be used. The utility power source 205 may electrically couple to the main disconnect 204 that functions to connect/disconnect power from the main cross bus bars 209M.

Modularly and directly coupled to the other side of the second panel apparatus (e.g., the main panel 202) may be a meter stack 206. The meter stack 206 may also couple directly to the main cross bus bars 209M and may also receive electrical power therefrom. The connection between the cross bus bars may be as described in U.S. Pat. Nos. 3,104,276; 3,183,298; 3,909,098; and 5,466,889, for example. Other suitable connections allowing modular, abutting construction of the systems 200, 400 may be used. The meter stack 206 may provide power to the tenant panels. Three tenants are shown. However, the meter stack 206 may be sized to accommodate any suitable number of tenants and tenant meters. The meter socket, load center combination apparatus 211 may have owner circuits 236 and/or community circuits 238 (community lighting, heating, and/or other electrical loads) connected thereto in addition to the parallel energy source 225.

Figure 5:
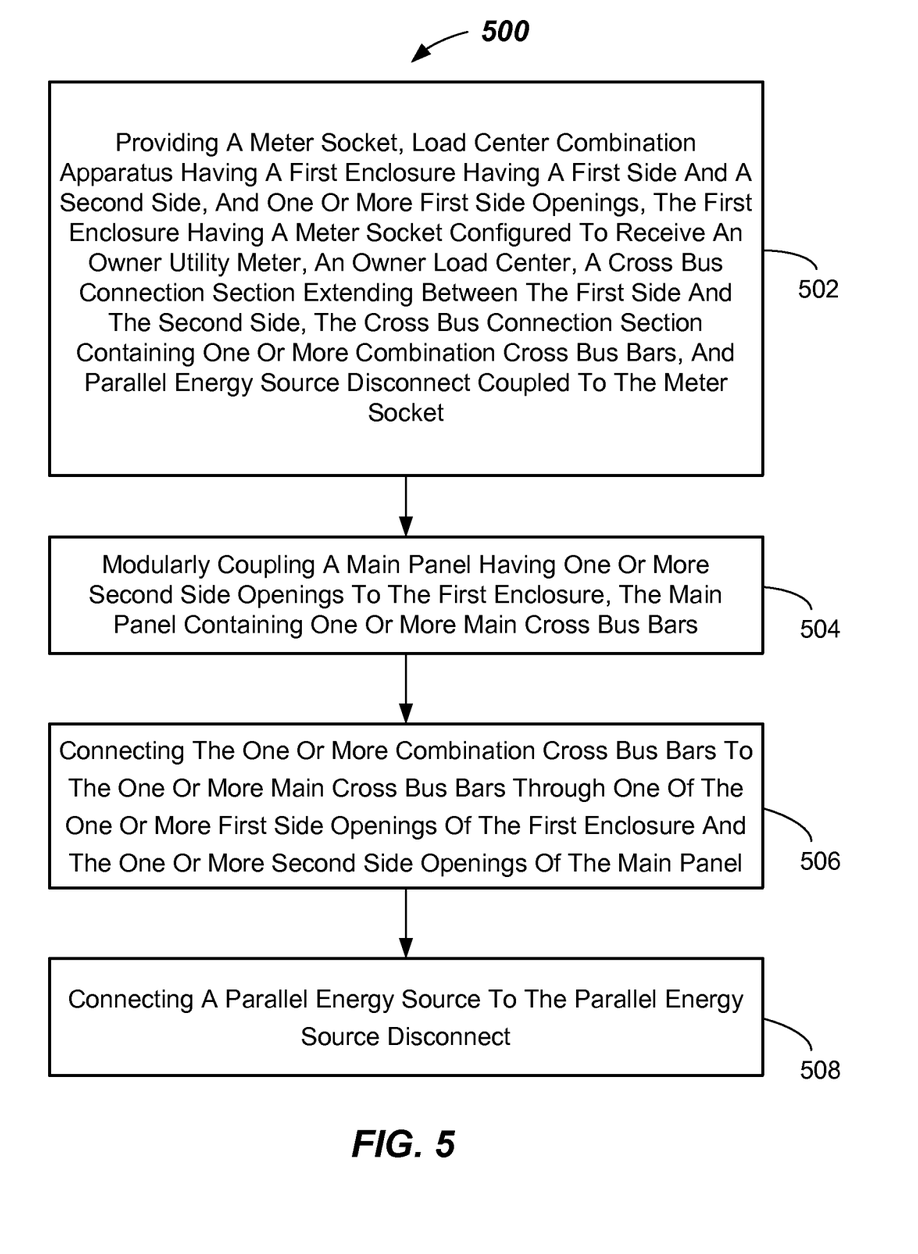
FIG. 5 is a flowchart of a method of configuring an electrical distribution system according to embodiments.

A method of method of configuring an electrical distribution system (e.g., electrical distribution system 200, 400) will now be described with reference to FIG. 5. The method 500 includes, in 502, providing a meter socket, load center combination apparatus (e.g., meter socket, load center combination apparatus 211) having a first enclosure (e.g., enclosure 313) having a first side (e.g., side 313A) and a second side (e.g., side 313B), and one or more first side openings (e.g., side openings 324, 326), the meter enclosure having a meter socket (e.g., meter socket 317S) configured to receive an owner utility meter (e.g., side 217), an owner load center (e.g., owner load center 219), a cross bus connection section (e.g., cross bus connection section 309C) extending between the first side and the second side, the cross bus connection section containing one or more combination cross bus bars (e.g., cross bus bars 209C), and parallel energy source disconnect (e.g., parallel energy source disconnect 223) coupled to the meter socket.

The method 500 further includes, in 504, modularly coupling a main panel (e.g., main panel 202) having one or more second side openings to the first enclosure, the main panel containing one or more main cross bus bars (e.g., main cross bus bars 209M).

The method 500 further includes, in 506, connecting the one or more combination cross bus bars (e.g., combination cross bus bars 209C) to the one or more main cross bus bars (e.g., main cross bus bars 209M) through the one of the one or more first side openings (e.g., side openings 324, 326), of the first enclosure and the one or more second side openings of the main panel (e.g., main panel 202).

The method 500 further includes, in 508, connecting a parallel energy source (e.g., parallel energy source 225) to the parallel energy source disconnect (e.g., parallel energy source disconnect 223).

As should be appreciated, the meter socket, load center combination apparatus 211 may be attached onto the other side of the main panel 202, whereas the meter stack 206 would then be attached on the opposite side.

It should be readily appreciated by those persons of ordinary skill in the art that the present invention is susceptible of broad utility and application. Many embodiments and adaptations of the present invention other than those herein described, as well as many variations, modifications, and equivalent arrangements, will be apparent from, or reasonably suggested by, the present invention and the foregoing description thereof, without departing from the substance or scope of the present invention. Accordingly, while the present invention has been described herein in detail in relation to specific embodiments, it is to be understood that this disclosure is only illustrative and presents examples of the present invention and is made merely for purposes of providing a full and enabling disclosure of the invention. This disclosure is not intended to limit the invention to the particular apparatus, systems and/or methods disclosed, but, to the contrary, the intention is to cover all modifications, equivalents, and alternatives falling within the scope of the invention.

What is claimed is:

1. An electrical distribution system, comprising:
 a main panel including a main disconnect adapted to electrically connect to a utility power source;
 a meter stack having one or more tenant utility meters, each tenant utility meter being electrically coupled to the main disconnect;
 a meter socket load center combination apparatus electrically coupled to the main disconnect, the meter socket load center combination apparatus including
  an owner utility meter,
  an owner load center electrically coupled to the owner utility meter and having a plurality of locations that receive circuit interface devices,
  a parallel energy source disconnect having an amperage rating up to an amperage rating of the owner load center; and
 a parallel energy source electrically coupled to the parallel energy source disconnect.

2. The electrical distribution system of claim 1, wherein the meter stack includes two or more tenant meters.

3. The electrical distribution system of claim 1, wherein the circuit interface devices comprises one or more:
 circuit breaker,
 electrical switch,
 branch monitoring device, surge protection device, or lug kit.

4. The electrical distribution system of claim 1, wherein the parallel energy source comprises one or more photo-voltaic panels.

5. The electrical distribution system of claim 1, wherein the meter socket load center combination apparatus includes one or more cross bus bar extending from a first side to a second side.

6. The electrical distribution system of claim 1, further comprising:

a load center combination circuit breaker, wherein the load center combination circuit breaker has an amperage rating of up to 600 A.

7. The electrical distribution system of claim 1, wherein the parallel energy source disconnect has an amperage rating of up to 600 A.

8. The electrical distribution system of claim 1, wherein an amperage rating of the owner load center and the parallel energy source disconnect are the same.

9. The electrical distribution system of claim 1, comprising community circuits or owner circuits connected to the owner load center.

10. The electrical distribution system of claim 1, wherein the meter socket load center combination apparatus includes an owner utility meter.

11. The electrical distribution system of claim 1, further comprising:

a load center combination circuit breaker, wherein the load center combination circuit breaker has an amperage rating of between 125 A and 600 A, and the parallel energy source disconnect has an amperage rating of between 125 A and 600 A.

12. The electrical distribution system of claim 1, wherein the main disconnect of the main panel has an amperage rating between 250 A and 2000 A.

13. The electrical distribution system of claim 1, wherein the main panel and the meter socket load center combination apparatus are modularly coupled to each other.

14. The electrical distribution system of claim 1, comprising main cross bus bars of the main panel electrically coupled to combination cross bus bars of the meter socket load center combination apparatus.

15. The electrical distribution system of claim 1, comprising a load center combination main breaker that protects the owner load center.

\* \* \* \* \*